June 15, 1971   H. MEHLER ET AL   3,584,380
OPENER DEVICE FOR PHOTOGRAPHIC FILM CARTRIDGES
Filed Oct. 17, 1968   4 Sheets-Sheet 1

INVENTORS.
HENRY MEHLER
CHARLES KALISH
BY
Edward F. Levy
ATTORNEY

INVENTORS
HENRY MEHLER
CHARLES KALISH

BY

Edward F. Levy
ATTORNEY

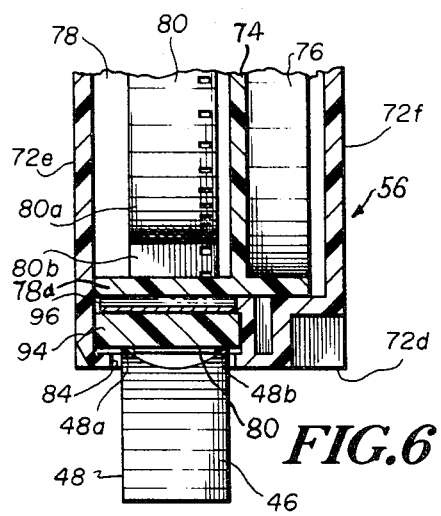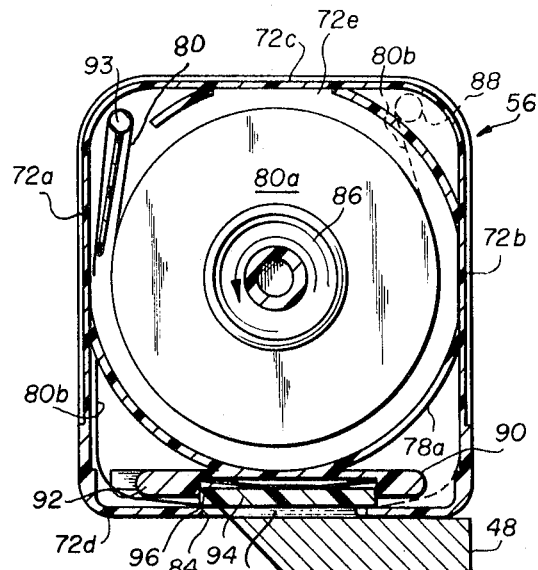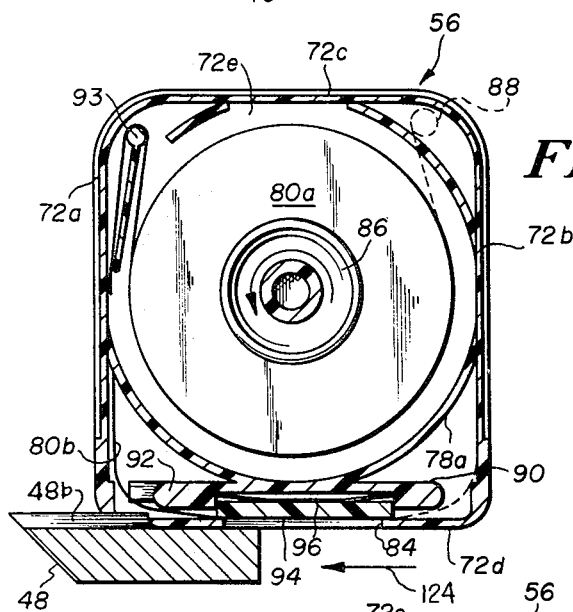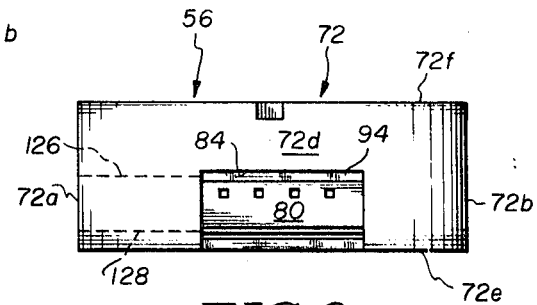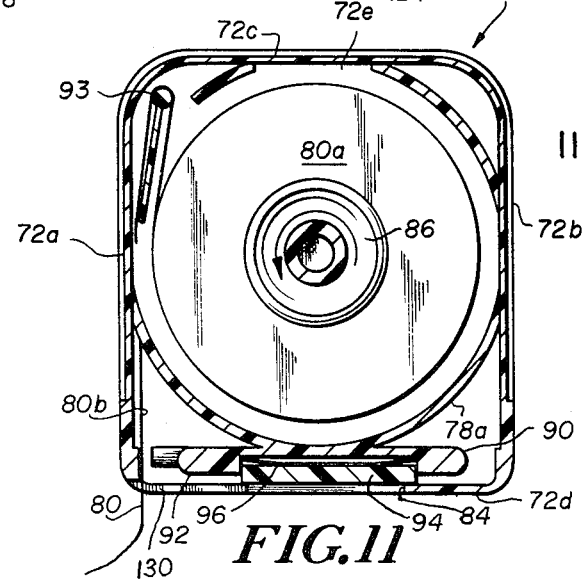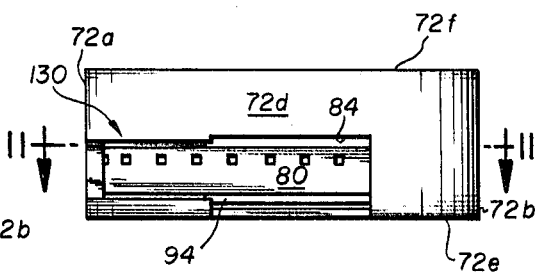

June 15, 1971    H. MEHLER ET AL    3,584,380
OPENER DEVICE FOR PHOTOGRAPHIC FILM CARTRIDGES
Filed Oct. 17, 1968    4 Sheets-Sheet 4
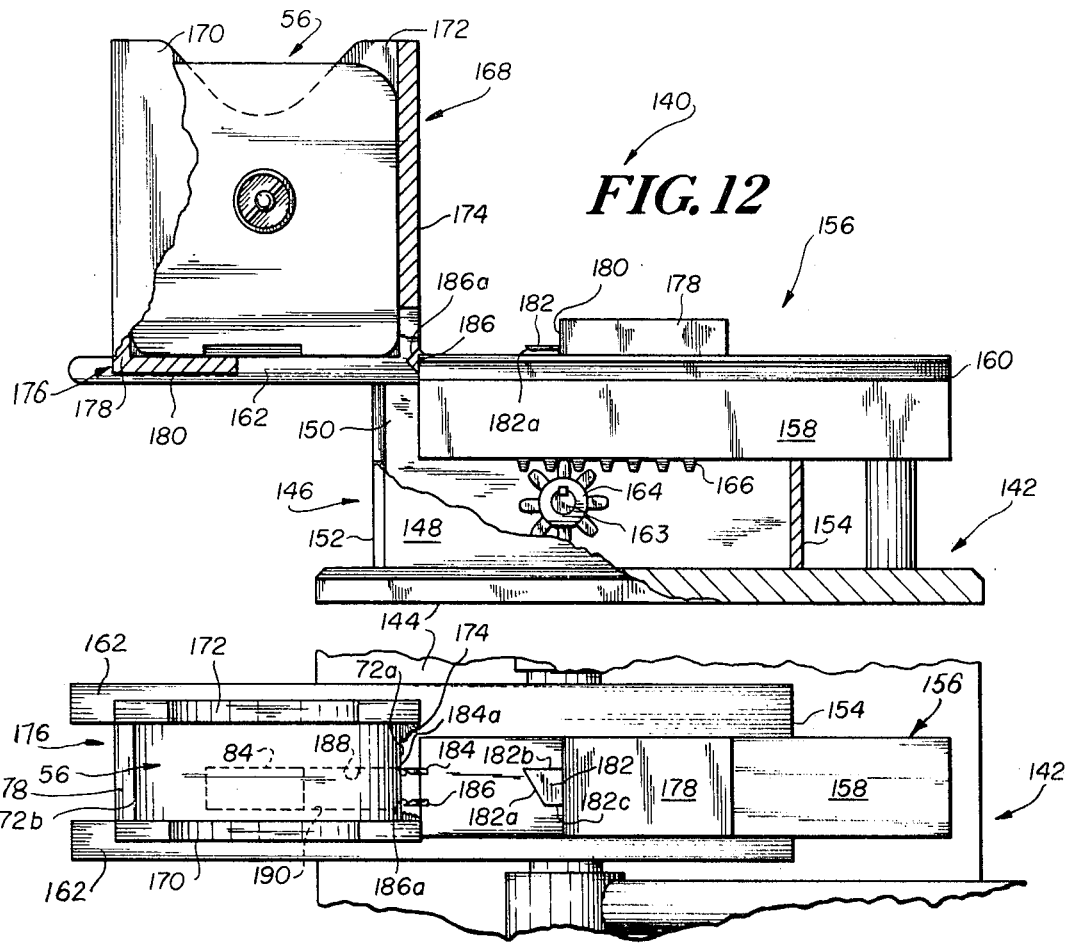
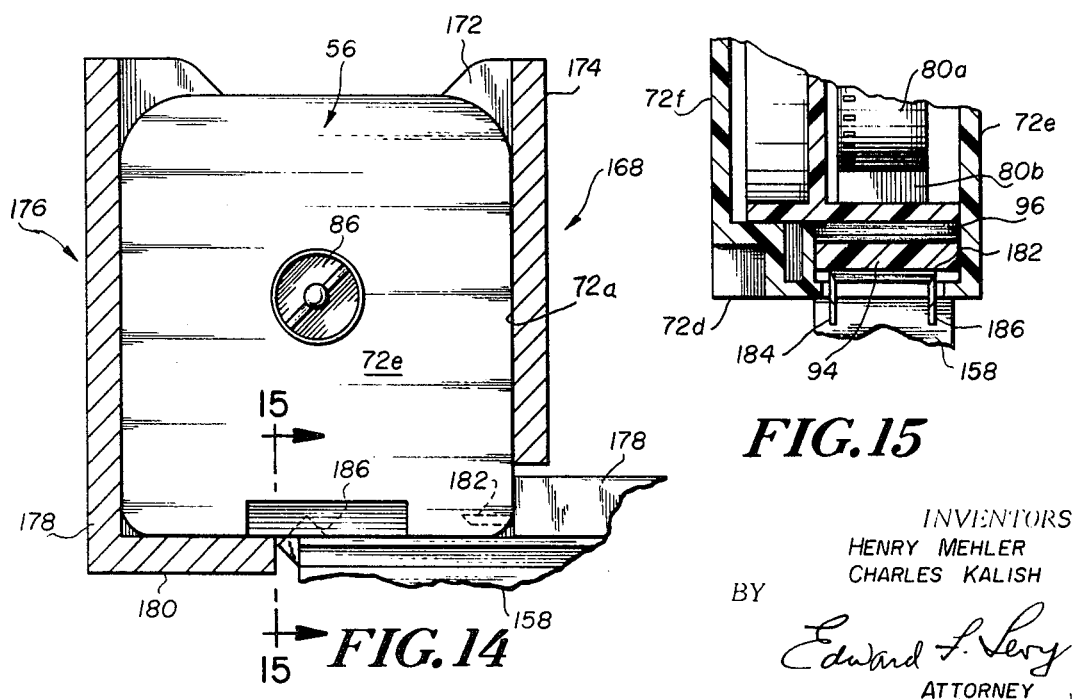
INVENTORS
HENRY MEHLER
CHARLES KALISH
BY
Edward F. Levy
ATTORNEY United States Patent Office 3,584,380
Patented June 15, 1971

3,584,380
OPENER DEVICE FOR PHOTOGRAPHIC FILM
CARTRIDGES
Henry Mehler, Rockaway Beach, and Charles Kalish,
Bayside, N.Y., assignors to U.S. Photographic Equipment Corp., Corona, N.Y.
Filed Oct. 17, 1968, Ser. No. 768,484
Int. Cl. B67b 7/24
U.S. Cl. 30—6
8 Claims

ABSTRACT OF THE DISCLOSURE

A tool for opening a motion picture film cartridge to facilitate removal of exposed film therefrom for development, wherein a reciprocating die carrying a cutter member is driven by crank means through a cutting stroke and a holder mounts the film cartridge immovably in such a position in the path of the cutting stroke that the cutter member cuts away a portion of the cartridge casing between an end wall and the exposure aperture thereof to release the film for removal from the cartridge.

---

Motion picture film, such as eight millimeter film, is commonly packaged in a sealed plastic cartridge for convenient snap-fit insertion into a motion picture camera and is adapted to permit automatic engagement of the camera sprocket mechanism with the film sprocket holes. During use of the camera, the film within the cartridge is withdrawn from a storage roll on one side of the cartridge and is wound up in an exposed roll on the other side of the cartridge, the film between the two rolls passing by an exposure aperture in the cartridge wherein it is in registry with the lens and shutter mechanism of the camera. The film is fully sealed in light-tight condition within the cartridge, enabling the user to remove the cartridge at any stage of film exposure for replacement, without ruining the contained film by exposing it to light.

After the film is fully exposed, the cartridge is sent to a processing laboratory for development of the film. Here a problem has been encountered in removing the film from the fully-sealed plastic cartridge. The exposure aperture is the only opening in the cartridge accessible from the exterior thereof, and while the trailing end portion of the exposed film is located within this exposure aperture, the cartridge is so constructed that a spring-biased tension plate presses the film against the edges of the exposure aperture. Consequently, it is impossible to pull the exposed film out of the cartridge through the exposure aperture without scratching or otherwise damaging the film.

To remove the film from the cartridge, therefore, resort is made to devices which break away the plastic walls of the cartridge or cut a circular hole in the cartridge wall adjacent the roll of exposed film. Such cartridge-opening means have several serious disadvantages. Since they operate on the principle of cutting away or breaking away an opening in communication with the roll of exposed film, they must be operated in a dark-room which makes it difficult to open the cartridge. In addition, the opening tool often comes in contact with the roll of film, physically damaging the same. Further, the exposed film is not wound on a reel but rather is wound in a loose roll on a small take-up hub, so that when the cartridge wall is broken away or cut away to provide a large opening through which this roll can be removed, the roll often unwinds and the film spills, dropping to the floor or otherwise becoming scratched, smudged or damaged.

It is therefore an object of the present invention to provide a film cartridge-opening tool which facilitates the removal of film therefrom.

Another object of the invention is to provide a tool of the character described which avoids any damage to the film during the opening operation or during removal of film from the cartridge.

Still another object of the invention is the provision of a tool of the character described which is capable of opening a film cartridge in an effective single-stroke operation.

A further object of the invention is the provision of a tool of the character described in which the cartridge is cut open at an area remote from the roll of exposed film so that the opening operation can be performed conveniently in a lighted room, and the cartridge can then be taken into a darkroom where the film can be unwound from the exposed roll as the film is removed, and wound directly on a processing drum without danger of the film spilling or becoming damaged.

In accordance with the invention herein, there is provided a tool for opening photographic film cartridges, which tool comprises a frame, a die mounted for reciprocating movement in said frame, and cutter means carried by said die. Means are provided for mounting a film cartridge with the exposure aperture thereof aligned with the cutter means and crank means are provided for driving the die to impart a cutting stroke to the cutter means whereby to cut through a selected portion of the cartridge between the exposure aperture and an end wall thereof. Accordingly, when the cutting stroke is imparted to the cutter means, the latter is operative to cut away a sufficient portion of the cartridge to free the film therein for removal from the cartridge.

Additional objects and advantages of the invention will become apparent during the course of the following specification when taken in connection with the accompanying drawings, in which:

FIG. 6 is an enlarged partial section corresponding to FIG. 5 showing the lower portion of the film cartridge and the cutting blade of the opener device located in the exposure aperture;

FIG. 7 is a central section through the film cartridge, as taken along line 7—7 of FIG. 5, showing the cutting blade at the beginning of the cutting stroke;

FIG. 8 is a section similar to FIG. 7, but showing the cutter blade at the end of the cutting stroke;

FIG. 9 is a bottom plan view of the film cartridge with the dotted lines indicating the path of the cutting stroke;

FIG. 10 is a bottom plan view of the film cartridge showing a portion cut away at the completion of the cutting stroke;

FIG. 11 is a section taken along line 11—11 of FIG. 10 and showing the interior of the cut cartridge and the manner in which the film is removed therefrom;

FIG. 12 is a side elevational view of a modified form of film cartridge opener device made in accordance with the invention, and showing a film cartridge mounted therein, with portions of the device broken away and shown in section to reveal inner construction;

FIG. 13 is a top plan view of the cutter die employed in the opener of FIG. 12;

FIG. 14 is a partial sectional view corresponding to FIG. 12, but showing the position of the cutter die at the completion of the cutting stroke; and FIG. 15 is a section taken along line 15—15 of FIG. 14.

Figure 1:
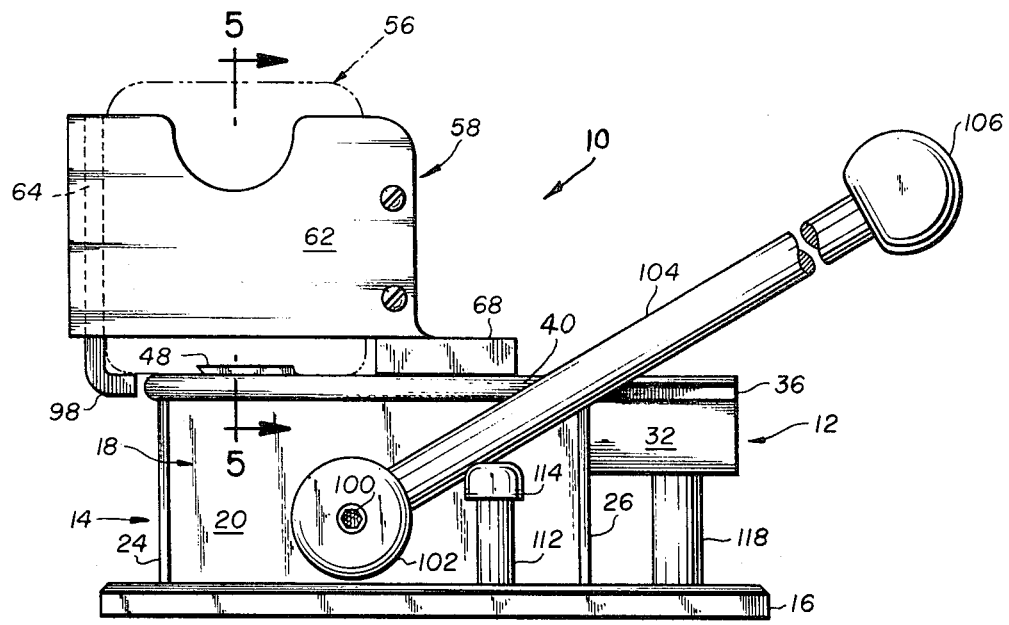
FIG. 1 is a side elevational view of a film cartridge opener device made in accordance with the present invention and showing a film cartridge mounted therein prior to the cutting operation, the cartridge being shown in phantom.

Referring in detail to the drawings, and in particular to FIGS. 1-4 thereof, a film cartridge opener device made in accordance with the present invention is designated generally by the reference numeral 10. The cartridge opener 10 is operable to cut open a film cartridge to release the film therein by means of a cutter die 12 mounted for reciprocal longitudinal sliding movement in a supporting frame 14. The die 12 and the entire frame 14 are preferably made of metal, such as steel.

Figure 3:
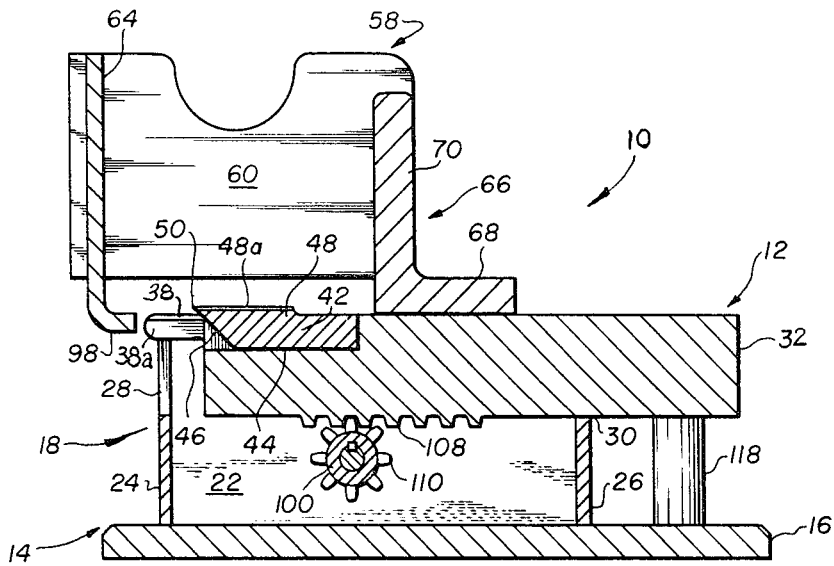
FIG. 3 is a section taken along line 3—3 of FIG. 2.

The frame 14 compurises a flat base 16, upstanding from which is a hollow housing 18 formed by a pair of spaced side walls 20 and 22 and front and rear end walls 24 and 26. The end walls 24 and 26 are identical in size and shape, and each is formed at its upper end with a respective rectangular slot 28 and 30, the side walls of which register with the inner surfaces of the spaced side walls 20 and 22 to provide a through track for the sliding movement of the cutter die 12 through the housing 18, as best seen in FIGS. 3 and 4.

Figure 4:
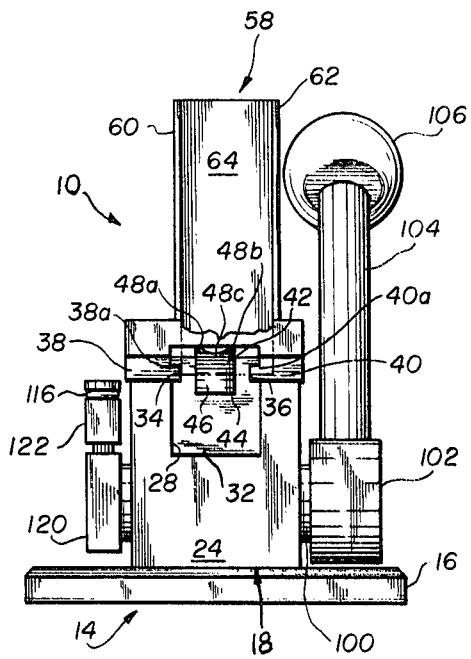
FIG. 4 is an end elevational view of the cutter device shown in FIG. 2, as viewed from the front end thereof.

The cutter die 12 in its preferred form comprises a metal bar 32 of substantially square cross-section, which is sized to fit snugly and slidably within the solts 28 and 30, with its upper portion projecting above said slots as shown in FIG. 4. At it upper opposite sides, the bar 32 has a pair of rectangular grooves 34 and 36 extending the length of said bar. A pair of guide strips 38 and 40 secured to the upper surfaces of the respective side walls 20 and 22, and extending the length thereof, have inwardly-projecting extension flanges 38a and 40a which fit slidably and snugly within the respective grooves 34 and 36 to guide the bar 32 accurately for straight-line movement in a longitudinal direction.

In the embodiment shown in FIGS. 1-6, the cutter die 12 includes a cutter member 42 in the form of an elongated metal block embedded and secured within a correspondingly shaped slot 44 in the upper forward portion of bar 32. The cutter member 42 has an inclined front wall 46 and an upper forward extension portion 48 which projects upwardly beyond the top surface of bar 32 and has, extending along its sides, a pair of spaced, longitudinal cutting edges 48a and 48b with a concave surface 48c therebetween. The inclined front wall 46 also has a concave surface as indicated at 46a in FIG. 2, to provide a pair of sharp points 48d and 48e at the front end of the longitudinal cutting edges 48a and 48b.

In order to hold a film cartridge 56 in proper position to be opened by the cutting edges of cutter member 42, a cartridge holder 58 is mounted on the supporting frame 14. The cartridge holder 58 comprises a pair of spaced parallel plates 60 and 62 interconnected at their forward end portion by a front wall 64. The holder 58 is mounted on the frame 14 by an L-shaped bracket 66 having a horizontal arm 68 which overlies and is secured to the guide strips 38 and 40, and an upstanding vertical arm 70 which is secured between plates 60 and 62 and serves as the rear wall of the cartridge holder 58.

FIGS. 5-8 show details of the film cartridge 56 which is a standard cartridge used to hold a length of eight millimeter motion picture film, and insertable in a cartridge-type motion picture camera for feeding the film past the lens thereof. The cartridge 56 comprises a flat, box-like housing 72 made of rigid plastic and having the substantially square configuration shown in FIGS. 7 and 8. The housing 72 is formed of front and rear walls 72a and 72b, top and bottom walls 72c and 72d, and side walls 72e and 72f.

Figure 5:
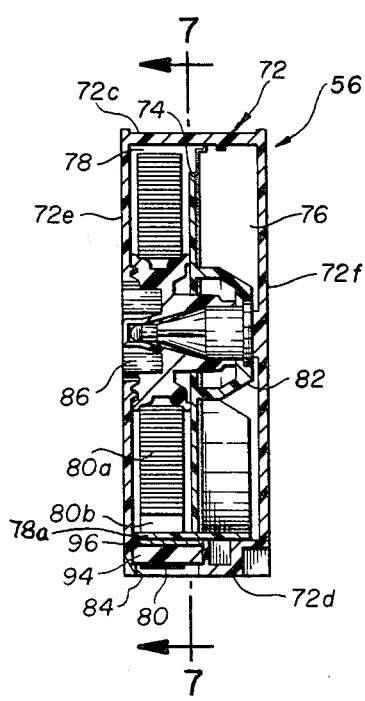
FIG. 5 is a section through a film cartridge used with the opener device, as taken along line 5—5 of FIG. 1.

The film cartridge 56 is conventional and well known so that its internal construction will be described only to such extent as required for an understanding of the present invention. The housing 72 is divided by a central wall 74 into adjacent compartments 76 and 78, as shown in FIG. 5. Initially, when the cartridge is sold for use, the film 80, in unexposed condition, is wound in a roll about a central storage core 82 in the compartment 76. The lead end of the film 80 is guided past an exposure aperture 84, and is attached to a rotatable hub 86 in the opposite compartment 78. When the cartridge 56 is inserted in a suitable motion picture camera, internal camera mechanism turns the rotatable hub 86, the outer end of which is accessible from the exterior of the cartridge, and the film is advanced past the exposure aperture 84 which is in registry with the lens and shutter mechanism of the camera. During this operation, the unexposed film is drawn off the roll on storage core 82 in compartment 76 and is wound in a roll of exposed film about the hub 86 in compartment 78.

FIGS. 5-9 show the film cartridge 56 in the condition in which it would be taken from a motion picture camera for development of the film, all of which has been exposed. In this condition, all of the film 80 has been drawn from the core 82 and has been wound in a roll 80a about the take-up hub 86 in compartment 78, except for a short trailing end portion of the film.

In operation of the cartridge 56 within the camera, the film from the unexposed roll on the storage core 82 passes over a guide member 88 and is guided downwardly along the end wall 72b as indicated in FIG. 7, the film then passing around guide members 90 and 92 which guide it in a straight line along bottom wall 72d, and in registry with exposure window 84. Thereafter, the film extends along end wall 72a and over guide member 93, from which it passes to take-up hub 86.

The exposure aperture 84 is of elongated rectangular shape, as shown in FIG. 9, and is located in bottom wall 72d at the side thereof adjacent side wall 72e. As shown in FIG. 5, the aperture 84 is in alignment with the compartment 78 which contains the take-up hub 86. It will be observed that the compartment 78 has a bottom wall 78a which separates it from the aperture 84 and prevents any light which may leak through window 84 from reaching either the exposed or unexposed film roll.

In passing above the exposure aperture 84, the film 80 is held flat against the front and rear edges of the window by a tension plate 94 which is biased downwardly by a leaf spring 96.

As previously indicated, after the film in cartridge 56 is exposed and taken from the camera for development, it is received in the processing laboratory in the condition shown in FIG. 5, that is with the film drawn from the unexposed roll in compartment 76 and wound upon the exposed roll in compartment 78. There is, however, a trailing end portion 80b of film extending from the exposed roll 80a and passing over guide member 93 and beneath guide members 90 and 92. Between the guide members 90 and 92, this trailing film portion 80b passes above the aperture 84 and is pressed thereagainst by the tension plate 94.

The film could be removed from the cartridge merely by grasping the trailing portion through the aperture 84 and pulling it out of the window until all of the film is unwound from the exposed roll 80a and leaves the cartridge. However, the tension of plate 94 against the end edge of aperture 84 would cause the film drawn therebetween to become scratched. Consequently, the cartridge opener device of the present invention is devised to cut open the cartridge at this end of the aperture 84 and provide an opening through which the film can be drawn freely for removal from the cartridge.

To cut open the cartridge 56 in this manner, the cartridge is inserted in the cartridge holder 58 with the aperture 84 facing downwardly, and is slid downward between the side wall plates 60, 62, the front wall 64 and the rear wall 70, which hold the cartridge snugly therebetween. If the cartridge 56 is inserted properly, that is with the aperture 84 located adjacent the plate 60, as viewed in FIG. 2, the cutting edges 48a and 48b of the cutter block 42 will enter the aperture 84 and the lower end portion of the cartridge 56 will depend below the lower edges of the plates 60 and 62 to engage aligned hook-shaped stop members 98 mounted upon and depending from the respective plates 60 and 62, as shown in FIG. 1. On the other hand, if the cartridge 56 is inserted with the aperture 84 facing in the wrong direction, the cutter block 42 will not enter said aperture, but will engage the bottom wall 72d of the cartridge so that the cartridge will not reach the stop members 98, and the user will thus be informed that the cartridge should be turned to the proper direction for cutting.

In order to actuate the cutter die 12 in such a manner as to provide a cutting stroke for opening a film cartridge inserted in holder 58, the device 10 is provided with a hand crank mechanism including a laterally extending shaft 100 extending through and journalled in side walls 20 and 22 of supporting frame 14. Shaft 100 has a hub 102 affixed to one end thereof. A crank arm 104 extends radially from hub 102 and is provided with a terminal hand knob 106 which may be grasped for manual turning movement of the crank arm 104 which provides rotational drive for the shaft 100.

The crank mechanism is adapted to impart a straight-line reciprocal movement to the cutter die 12, and for this purpose, a rack 108 is formed on the under surface of the bar 32, as shown in FIG. 3. A pinion 110 is secured to the central portion of shaft 100 in such a position that the teeth of said pinion 110 mesh with the teeth of rack 108.

Figure 2:
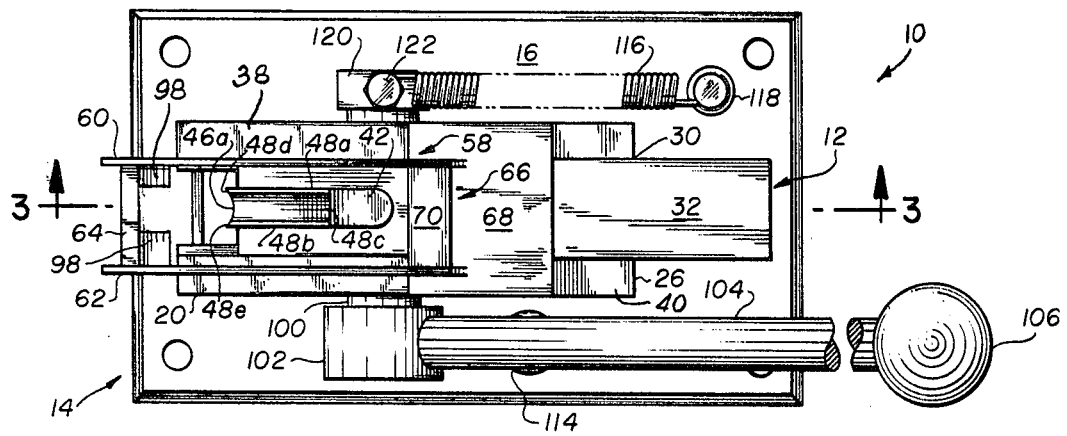
FIG. 2 is a top plan view of the opener device shown in FIG. 1, but with the film cartridge removed therefrom.

Referring to FIGS. 1–3, it is seen that rotation of crank arm 104 will cause pinion gear 110 to drive rack 108 and thereby impart a straight line motion to cutter die 12. Thus, rotation of crank arm 104 in the counterclockwise direction will cause cutter die 12 to be driven to the left, as viewed in FIGS. 1 and 3, in a forward direction toward frame front wall 24, while the reverse rotation of crank arm 104 will cause reverse motion of cutter die 12, i.e. to the right. As will hereinafter be described, the aforementioned leftward movement of cutter die 12 constitutes the cutting stroke of cutter member 42, while the aforementioned rightward movement of cutter member 42 constitutes the retraction stroke.

In order to limit the aforementioned retraction stroke of cutter member 42, there is provided an upright stop post 112 mounted on base 16 at a suitable point in the plane of the arcuate motion of crank arm 104, so that stop post 112, which is provided with a resilient head 114 of soft rubber or the like, will limit the clockwise motion of crank arm 104 as shown in FIG. 1. Stop post 112 is spaced rearwardly of hub 102 such that crank arm 104 will abut stop head 114 when cutter die 12 is at the beginning of the cutting stroke. At the end of the cutting stroke, in order to automatically return crank arm 104 to its position at the beginning of the cutting stroke, a spring 116 is mounted at one end thereof on a support post 118 upstanding from base 16, with the opposite end of spring 116 connected to a disc 120 secured to the end of shaft 100 opposite the one end carrying hub 102. Spring 116 has its end fixed to the head of bolt 122 which secures disc 120 to crank shaft 100, such that when crank arm 104 is in the retracted position shown in FIG. 1, bolt 122 extends vertically upward from the top of disc 120, and spring 116 is in slight tension. Accordingly, at the end of the cutting stroke, as depicted by FIG. 8, spring 116 will be in its extended condition and hence operate to urge crank arm 104 back to its retracted position.

In operation, the crank mechanism of the device is normally maintained in the inoperative, retracted position of FIG. 1 by tension of the spring 116. When the cartridge 56, containing exposed film, is oriented in the proper direction and inserted into the cartridge holder 58, it is slid downwardly between the side wall plates 60, 62, front wall 64 and bracket arm 70, until its front end engages the stop members 98, in the manner shown in FIG. 1. In this condition, the raised longitudinal cutting edges 48a and 48b of the cutter member 42 are so located that they project upwardly into the exposure aperture 84 of the film cartridge 56, as shown in FIGS. 1 and 7.

As best shown in FIG. 6, the parallel cutting edges 48a and 48b are spaced apart by a distance slightly greater than the width of the film 80 within cartridge 56, and appreciably less than the width of exposure aperture 84, so that while the cutting edges 48a and 48b extend into said aperture 84 with some clearance, they bracket the trailing end portion 80b of film therein and do not contact the latter during the cutting stroke, thereby avoiding damage to the film.

With the cartridge 56 so mounted in the holder 58, the operator manually pulls crank arm 104 in a forward or counterclockwise direction as viewed in FIG. 1, whereupon the cutter die 12 is driven in a cutting stroke in a straight line path parallel to the bottom wall 72d of the mounted film cartridge 56, as indicated by arrow 124 in FIG. 8. During this cutting stroke, the cutting edges 48a and 48b cut through the cartridge bottom wall 72d from the forward end of the exposure aperture 84 to the cartridge front wall 72a, along paths indicated by the dotted lines 126 and 128 in FIG. 9. As the cutter die 12 approaches the end of the stroke, the pointed ends 48d and 48e of cutting edges 48a and 48b engage and pierce the lower end of cartridge front wall 72a, and the concave cutting edge 46a of the inclined front wall 46 slices horizontally through cartridge front wall 72a, thereby severing the cut-out portion of the cartridge bottom wall 72d defined by the parallel lines 126, 128 which extend from the forward end of the exposure aperture 84 forwardly through the cartridge front wall 72a.

The effect of the cutting stroke in severing the aforementioned portion of the cartridge bottom wall, is to form in said bottom wall 72d an elongated extension of the exposure aperture 84 indicated at 130 in FIG. 10. This aperture extension 130 frees the trailing end portion of the film 80 from pressing engagement with one end of the tension plate 94 so that the free end of the film 80 may be pulled out of the cartridge 56 in the manner shown in FIG. 11 and the film then drawn outwardly of the cartridge through the passageway leading to the take-up roll of exposed film, without contact with the tension plate, so that scratching of the film is avoided.

In practice, the cartridge may be cut by the opener device 10 in a lighted room without danger of light exposure to the film within the cartridge. The operator then pulls out the free end of the trailing portion from exposure aperture 84 and its cut-out extension 130, and attaches an identification label to said free end. The cartridge is then taken into the photographic darkroom wherein the cartridge is easily mounted in a holder, and the free end of the film is spliced to film wound on a processing reel which is turned to draw the entire film from the cartridge. As the film is withdrawn, it passes through the cut-out window extension 130, free of the tension plate 94.

FIG. 12 shows an alternate embodiment of the invention wherein the cartridge opener device is modified to cut the cartridge bottom wall from the end wall thereof in the direction of the exposure aperture, rather than from the aperture to the end wall, as in the previously described embodiment. This results in a cleaner cut and more readly separation of the cut-away bottom wall portion from the cartridge.

The cartridge opener device 140 shown in FIG. 12 is generally identical to the device 10 to FIG. 1, except for the changes hereinafter noted. The frame 142 again comprises a flat base 144 mounting a hollow housing 146 formed of side walls 148 and 150, and front and rear walls 152 and 154 identical to those of the previous embodiment.

The cutter die 156 is again in the form of a metal bar 158 of square cross-section, having at each side a longitudinal groove 160 into which extend respective guide strips 162 secured to the upper surfaces of the side walls 148 and 150 for guiding the bar 158 for a stright-line horizontal movement. The same crank mechanism shown in FIGS. 1 and 2 is employed for driving the cutter die 156, and is not shown in the broken-away view of FIG. 12. It will be understood that operation of the crank mechanism turns a shaft 163 and mounted pinion gear 164 which meshes with a rack 166 on the under surface of bar 158 for moving the latter longitudinally.

In this instance, the cartridge holder 168 is mounted forwardly of the cutter die 156, and is of a construction somewhat different from the cartridge holder 58 previously described. It will be observed in FIG. 12 that the guide strips 162 are considerably elongated and project well forwardly from the housing 146. The cartridge holder 168 comprises a pair of spaced parallel plates 170, 172, constituting the side walls thereof, which plates are interconnected at their rear end portions by a rear wall 174 and at their front wall portions by the vertical arm 178 of an L-shaped bracket 176, which arm 178 constitutes the front wall of holder 168. The horizontal arm 180 of bracket 176 serves as the bottom wall of the holder 168 and also is secured between the projecting portions of the guide strips 162 to mount the cartridge holder 168 securely on the cartridge opener frame 142.

The cartridge holder front wall 174 terminates well above the bottom of the holder, and the bottom wall 180 terminates short of the center of the holder, as shown in FIG. 12, to provide open spaces for the passage of the cutter blades, in a manner to be presently described. When a film cartridge 56 is inserted into the cartridge holder 168, it is held snugly between the front, rear and side walls thereof, and rests upon the bottom wall 180 in the manner shown in FIG. 12, being thus properly positioned to receive the cutting stroke of the cutter die 156.

The cutter bar 158 includes an upstanding extension 178 extending from the rear of bar 158 to a point inwardly of the front thereof, and forming a forward shoulder 180. Embedded in the shoulder 180 and projecting forwardly thereof, in longitudinal alignment with the bar 158, is a horizontal shear blade 182. A pair of parallel, spaced slicing blades 184 and 186 are also fixedly embedded in cutter die 156 at the upper front corner of bar 158, blades 184, 186 being upwardly inclined at an angle to the axis of bar 158 to present inclined forward cutting edges 184a and 186a.

As shown in FIG. 13, the shear blade 182 has a wedge-shaped leading cutting edge 182a and a pair of parallel spaced side edges 182b and 182c which are aligned with the forward cutting edges 184a and 186a of the respective slicing blades 184 and 186. Shear blade 182 is also vertically spaced above the upper forward surface of bar 158 so as to be located at the same level of elevation as the pointed upper corners of the slicing blades 184, 186. Thus, during the cutting stroke, shear blade 182 will cut the cartridge end wall 72a at the same depth as the slicing blades 184 and 186.

The operation of the opener device 156 is similar to that previously described for the opener device 10. Thus, with the film cartridge 56 suitably inserted in holder 168, and the crank arm in the same starting position as crank arm 104, in FIG. 1, the manual turning of the crank arm will cause the cutter die 156 to move in a left-hand direction, as viewed in FIG. 1, toward the mounted cartridge 56, by means of the pinion 164 and rack 166. Such movement of the cutter die 156 constitutes the cutting stroke, but in this instance, the slicing blades 184 and 186 cut through the cartridge 56 in the opposite direction from that previously described, that is in direction from the cartridge end wall 72a to the adjacent end of the exposure aperture 84. In order to accomplish this, the cartridge 56 is inserted into the holder 168 in the reverse position from that in which it was inserted in the embodiment of FIG. 1, that is to say in the position in which the end wall 72a faces the cutter die 156. In this position, the offset exposure aperture 84 is adjacent the holder side plate 170, as shown in FIG. 13, wherein it will also be observed that the shear blade 182 and slicer blades 184 and 186 are likewise offset from the central axis of holder 168 so as to be in alignment with the exposure aperture 84.

During the cutting stroke, the slicer blades 184 and 186 move into engagement with cartridge end wall 72a and slice therethrough, producing two spaced vertical cuts extending upwardly a short distance from the bottom wall thereof. The slicer blades then continue their movement, slicing through the cartridge bottom wall 72d, along the cut lines indicated in broken line at 188 and 190 in FIG. 13. The slicer blades 184 and 186 are spaced apart a sufficient distance to bracket the film within the cartridge, thereby preventing damage to the film.

Toward the end of the cutting stroke, the leading edge 182a of shear blade 182 engages the cartridge end wall 72a, and slices therethrough just as the slicer blades 184, 186 complete their cut through bottom wall 72d and pierce the edge of exposure aperture 84, as shown in FIG. 14. The shear blade 182 produces a horizontal cut through end wall 72a between the top ends of the vertical cuts produced by the slicer blades, and thus severs the cut wall portion from the cartridge. This produces a somewhat cleaner cut-away cartridge portion than the cutting means of the embodiment of FIG. 1, and provides a larger opening for extraction of the contained film from the cartridge.

It will be appreciated that one of the particular advantages of the invention herein resides in the safety feature inherent in the construction of the opener device in such a manner that the cutting blades are always in a shielded position. Thus, even though the operator may insert, open and remove film cartridges in a rapid manner, there is little or no danger of the operator cutting his hands either while the opener device is in inoperative position or during the cartridge cutting operation.

While preferred embodiments of the invention have been shown and described herein, it is obvious that numerous omissions, changes and additions may be made in such embodiments without departing from the spirit and scope of the invention.

What is claimed is:

1. Apparatus for opening a hollow photographic film cartridge of the type having a bottom wall, a pair of end walls normal to said bottom wall, a rectangular exposure aperture in the bottom wall thereof offset from the central axis of said bottom wall, and having a terminal portion of exposed film extending along said bottom wall, said apparatus comprising a frame, a die mounted for reciprocating movement in said frame, cutter means fixed to said die, crank means for driving said die to impart a cutting stroke to said cutter to cut away a preselected portion of the bottom wall of said cartridge, said cutter means having a pair of parallel spaced cutting edges extending longitudinally in a plane parallel to the direction of said cutting stroke, and a holder mounted in said frame for receiving a cartridge and fixedly positioning said cartridge to locate the bottom wall thereof in a plane parallel to said cutting stroke and said preselected portion of said bottom wall in the path of said cutting edges whereby upon imparting said cutting stroke to said cutter, said cutter is operative to cut away said preselected wall portion of said cartridge to thereby further expose said terminal portion of film in said cartridge and to facilitate the removal of the film from said cartridge.

2. Apparatus according to claim 1 wherein said die comprises an elongated bar and said crank means comprises a rack fixed to the underside of said die, a shaft rotatably mounted in said frame, a pinion gear coaxially mounted on said shaft for driving engagement with said rack, and a crank arm extending from said shaft at one end thereof, whereby upon imparting a rotative force to said crank arm said pinion gear is operative to import a straight line longitudinal motion to said reciprocating bar, said cutter means being mounted on the forward end of said bar opposite said holder with said cutting edges extending longitudinally along one longitudinal surface of said bar, and projecting therefrom laterally.

3. Apparatus according to claim 1 in which said cutter means is located relative to said holder such as to be operative to cut along a preselected portion of said bottom wall of an inserted cartridge between said aperture and one end wall of said cartridge, to thereby effectively enlarge said aperture.

4. Apparatus according to claim 3 in which said cutter means is offset from the central axis of said holder and in alignment with the longitudinal axis of said exposure aperture of an inserted cartridge.

5. Apparatus according to claim 4 in which said spaced cutting edges are parallel to said straight line cutting path of said cutter and are spaced apart a distance greater than the width of the film in said cartridge.

6. Apparatus according to claim 5 in which said holder is located relative to said cutter means to hold an inserted cartridge in such a position that in said cutting stroke said cutting edges of said cutter are operative to cut through said cartridge bottom wall along a pair of lines in alignment with the longitudinal edges of said aperture to one end of said bottom wall, with said cutting edges located on either side of the film extending along said bottom wall.

7. Apparatus according to claim 5 wherein said crank means is arranged to impart to said elongated bar a cutting stroke of such an extent that said cutting stroke straight line path begins at one end wall of said cartridge and terminates at the adjacent edge of said exposure aperture in said bottom wall.

8. Apparatus according to claim 7 wherein said cutter means also includes a horizontal blade spaced rearwardly of said parallel spaced cutting edges in the path of said cutting stroke.

References Cited

UNITED STATES PATENTS 627,752   6/1899   Herron _____ 30—5.5

OTHELL M. SIMPSON, Primary Examiner